United States Patent
Lee et al.

(10) Patent No.: US 12,450,787 B2
(45) Date of Patent: Oct. 21, 2025

(54) AUTOMATIC CARICATURE GENERATING METHOD AND APPARATUS

(71) Applicant: POSTECH Research and Business Development Foundation, Pohang-si (KR)

(72) Inventors: Seung Yong Lee, Seoul (KR); Yu Cheol Jung, Incheon (KR); Gwang Jin Ju, Yeosu si (KR); Won Jong Jang, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 426 days.

(21) Appl. No.: 17/974,399

(22) Filed: Oct. 26, 2022

(65) Prior Publication Data

US 2023/0206515 A1 Jun. 29, 2023

(30) Foreign Application Priority Data

Dec. 28, 2021 (KR) .................. 10-2021-0189831
Feb. 18, 2022 (KR) .................. 10-2022-0021764

(51) Int. Cl.
*G06T 11/00* (2006.01)
*G06T 11/60* (2006.01)
(Continued)

(52) U.S. Cl.
CPC ............ *G06T 11/001* (2013.01); *G06T 11/60* (2013.01); *G06V 10/771* (2022.01); *G06V 10/82* (2022.01); *G06T 2210/44* (2013.01)

(58) Field of Classification Search
None
See application file for complete search history.

(56) References Cited

U.S. PATENT DOCUMENTS

2021/0209464 A1  7/2021  Bala et al.
2021/0241497 A1  8/2021  Agrawal et al.
(Continued)

FOREIGN PATENT DOCUMENTS

KR  20210083276 A  7/2021

OTHER PUBLICATIONS

Rameen Abdal et al., Image2StyleGAN: How to Embed Images Into the StyleGAN Latent Space?, dated Sep. 3, 2019, 23 pages.
(Continued)

*Primary Examiner* — James A Thompson
(74) *Attorney, Agent, or Firm* — Morgan, Lewis & Bockius LLP

(57) ABSTRACT

The present disclosure provides a caricature generation method capable of expressing detailed and realistic facial exaggerations and allowing a reduction of training labor and cost. A caricature generating method includes: providing a generation network comprising a plurality of layers connected in series including coarse layers of lowest resolutions and pre-trained to be suitable for synthesizing a shape of a caricature and fine layers of highest resolutions and pre-trained to be suitable for tuning a texture of the caricature; applying input feature maps representing an input facial photograph to the coarse layers to generate shape feature maps and deforming the shape feature maps by shape exaggeration blocks to generate deformed shape feature maps; applying the deformed shape feature maps to the fine layers to change a texture represented by the deformed shape feature maps and generate output feature maps; and generating a caricature image according to the output feature map.

16 Claims, 11 Drawing Sheets

(51) Int. Cl.
*G06V 10/771* (2022.01)
*G06V 10/82* (2022.01)

(56) References Cited

U.S. PATENT DOCUMENTS

| | | |
|---|---|---|
| 2021/0279952 A1 | 9/2021 | Chen et al. |
| 2021/0343063 A1 | 11/2021 | Garbin et al. |
| 2022/0012596 A1 | 1/2022 | Nie et al. |
| 2022/0028139 A1 | 1/2022 | Mitra et al. |
| 2022/0036534 A1 | 2/2022 | Chakrabarty et al. |
| 2022/0044352 A1* | 2/2022 | Liao .................... G06F 18/2135 |
| 2022/0237896 A1* | 7/2022 | He ..................... G06V 10/7715 |
| 2022/0375024 A1* | 11/2022 | Luo .......................... G06N 3/08 |
| 2023/0115028 A1* | 4/2023 | Arunachala ............. A63F 13/67 345/619 |

OTHER PUBLICATIONS

Tero Karras et al., A Style-Based Generator Architecture for Generative Adversarial Networks, dated Mar. 29, 2019, 12 pages.
Kaiming He et al., Deep Residual Learning for Image Recognition, 9 pages.
Zheng et al, "Representation-guided generative adversarial network for unpaired photo-to-caricature translation," Computers and Electrical Engineering 90 (2021) 106999.

* cited by examiner

AUTOMATIC CARICATURE GENERATING METHOD AND APPARATUS

CROSS-REFERENCE TO RELATED APPLICATION

The present application claims convention priorities under 35 U.S.C. § 119(a) based on Korean Patent Applications No. 10-2021-0189831 filed on Dec. 28, 2021, and No. 10-2022-0021764 filed on Feb. 18, 2022, the entire contents of which are incorporated herein in their entireties by reference.

BACKGROUND

1. Technical Field

The present disclosure relates to a method and apparatus for generating a caricature and, more particularly, to a method and apparatus for automatically generating the caricature using a neural network that may be trained based on a machine learning and has a specialized network architecture.

2. Related Art

A caricature is a type of portrait in which an artist exaggerates the most recognizable characteristics of a subject while oversimplifying other characteristics. To draw a caricature, the artist has to learn how to not only paint in a cartoon style but also capture and exaggerate the most salient facial features, which requires longtime of training for development. Even after developing the skills, it may take hours or even days for the artist to draw a single piece of caricature. An automatic computational strategy for a photograph-to-caricature translation may reduce the training and production burdens and allow the caricatures to be readily available for the general public.

Early studies in the caricature generation suggested methods to capture and deform facial geometric features, but they relied on user interaction to produce impressive results. Several automatic caricature generation methods were proposed, but their artistic styles were limited to pre-defined rules.

Recent deep learning algorithms for image-to-image translations can find a mapping from an input domain to an output domain when sufficient training examples are given. However, it is difficult to acquire sufficient training dataset that can be used for a supervised learning for the automatic photo-caricature translation, i.e., photograph-caricature pairs with good correspondences. In particular, lots of caricatures corresponding to respective photographs of persons may vary in the poses, expressions, and exaggeration styles of the caricatures, and the correspondences between the photographs and respective caricatures are not uniform, which makes the supervised learning more difficult. Therefore, the caricatures made by hand by caricature experts may be required for the supervised learning. However, a large collection of such training dataset of photograph-caricature pairs may require a large expenses.

Many of the recent automatic caricature algorithms involve a specialized network architecture that transforms a photograph into a caricature through a geometric transformation. According to these methods, an image style is transferred to make the face photograph look like a caricature, and then the caricature is generated by exaggerating the face by a two-dimensional (2D) image warping. However, these methods may not be able to express detailed facial exaggerations due to a limitation of a number of control points. An interpolation of sparse control points to compensate for the lack of the control points may result in a loss of detailed shape deformations present in the real caricatures. A technique of exaggerating the face using a dense warping field has also been proposed to solve the problem, but such a technique requires warping fields created by actual caricature artist as the training data. Accordingly, the method may be laborious and require considerable cost to collect lots of training data for the warping field, which may limit its practical use.

SUMMARY

An exemplary embodiment of the present disclosure provides a caricature generation method capable of expressing more detailed and realistic facial exaggerations than a geometric warping in an image space and allowing a great reduction of labor and cost required for the training An exemplary embodiment of the present disclosure provides a caricature generation apparatus capable of expressing more detailed and realistic facial exaggerations than a geometric warping in the image space and greatly reducing the labor and cost required for the training.

According to an aspect of an exemplary embodiment, a caricature generating method includes: providing a generation network comprising a plurality of layers connected in series including coarse layers of lowest resolutions and pre-trained to be suitable for synthesizing a shape of a caricature and fine layers of highest resolutions and pre-trained to be suitable for tuning a texture of the caricature; applying input feature maps representing an input facial photograph to the coarse layers to generate shape feature maps and deforming the shape feature maps by shape exaggeration blocks each comprising at least one convolutional layer to generate deformed shape feature maps; applying the deformed shape feature maps to the fine layers to change a texture represented by the deformed shape feature maps and generate output feature maps; and generating a caricature image according to the output feature map.

The operation of providing the generation network may include: preparing a plurality of series-connected caricature generation learning layers, training the plurality of series-connected caricature generation learning layers with caricature images, preparing a plurality of series-connected photo reconstruction learning layers, and training the plurality of series-connected photo reconstruction learning layers with photographs; and adopting caricature generation learning layers of the lowest resolutions as the coarse layers, adopting photo reconstruction learning layers of the highest resolutions as the fine layers, and combining the coarse layers and the fine layers to configure the generation network.

The operation of providing the generation network may further include connecting the shape exaggeration blocks to the coarse layers in the generation network.

Each of the shape exaggeration blocks may be connected to respective one of the coarse layers in the generation network.

The operation of providing the generation network may further include performing a machine learning on the generation network. The operation of performing the machine learning on the generation network may include: determining an generative adversarial image loss by a first discriminator configured to discriminate images and determining an generative adversarial feature map loss by a second discriminator configured to discriminate feature maps; and training the generation network based on the generative adversarial image loss and the generative adversarial feature map loss.

The operation of applying the input feature maps to the coarse layers to generate shape feature maps and deforming the shape feature maps by the shape exaggeration blocks to generate deformed shape feature maps may include: generating caricature shape feature maps by applying the shape feature maps to the shape exaggeration blocks; and adding the caricature shape feature maps to the shape feature maps to generate the deformed shape feature maps.

The operation of performing the machine learning on the generation network may further include: calculating a cyclic consistency loss in a process of translating the input feature maps into the output feature maps and translating the output feature maps into reconstructed input feature maps; and training the shape exaggeration blocks such that a total loss which is defined as a weighted sum of a plurality of losses including the cyclic consistency loss is minimized.

The operation of performing the machine learning on the generation network may further include: calculating an attribute matching loss defined as a binary cross entropy loss between attributes of the input facial photograph and attributes of the caricature. In this case, the total loss may be calculated as the weighted sum of the plurality of losses including the cyclic consistency loss and the attribute matching loss.

The operation of generating the caricature shape feature maps may include: receiving from a user, exaggeration magnitudes indicating a degree of deformation of the caricature; and changing a scale factor for each of the shape exaggeration blocks, the scale factor indicating a ratio of a corresponding caricature shape feature map to be added to a corresponding shape feature map.

According to another aspect of an exemplary embodiment, a caricature generating apparatus based on an artificial neural network includes: a memory storing program instructions; and a processor coupled to the memory and executing the program instructions stored in the memory. The program instructions, when executed by the processor, causes the processor to: prepare a generation network comprising a plurality of layers connected in series including coarse layers of lowest resolutions and pre-trained to be suitable for synthesizing a shape of a caricature and fine layers of highest resolutions and pre-trained to be suitable for tuning a texture of the caricature; apply input feature maps representing an input facial photograph to the coarse layers to generate shape feature maps and deforming the shape feature maps by shape exaggeration blocks each comprising at least one convolutional layer to generate deformed shape feature maps; apply the deformed shape feature maps to the fine layers to change a texture represented by the deformed shape feature maps and generate output feature maps; and generate a caricature image according to the output feature map.

According to an exemplary embodiment of the present disclosure, the facial shape is deformed in the feature space through an exaggeration process. In particular, structure information is separated from texture information, and the exaggeration is conducted only for the structure. The shape exaggeration blocks performs the exaggeration of the facial features by transforming shape feature map s into caricature shape feature maps using a convolutional neural network. Thus, the present disclosure enables more detailed and realistic facial exaggeration than the geometric warping in the image space. Further, present disclosure allows a multi-scale exaggeration control according to the user's taste.

The caricature generating apparatus according to the present disclosure may be trained by simply using caricature pictures without warping field. Accordingly the labor and cost required for the training may be significantly reduced. The caricature generating apparatus according to the present disclosure may be used in extensive applications, for example, in image editing application programs installed in a portable device such as a smartphone.

BRIEF DESCRIPTION OF THE DRAWINGS

In order that the disclosure may be well understood, there will now be described various forms thereof, given by way of example, reference being made to the accompanying drawings, in which.

Figure 1:
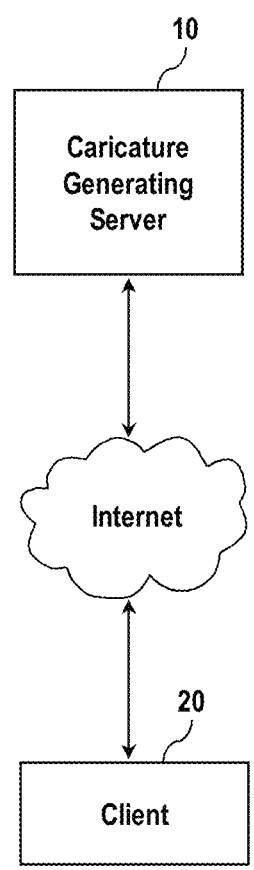
FIG. 1 is a block diagram illustrating a network environment of a caricature generating apparatus according to an exemplary embodiment of the present disclosure.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

FIG. 1 is a block diagram illustrating a network environment of a caricature generating apparatus according to an exemplary embodiment of the present disclosure. In an exemplary embodiment, the caricature generating apparatus may be implemented based on a server system providing a caricature generating service through Internet. The server system 10 may receive a service request from a client 20 accessing the server system 10 through the Internet and generate a caricature of a person in an input photographic image provided by the client 20 or a person specified by the client 20 in response to the service request to output the caricature to the client 20. The client 20 may specify a degree of facial shape deformation in the caricature when submitting the input photographic image or after receiving the generated caricature, so that the server system 10 may generate the caricature according to the degree of facial shape deformation specified by the client 20. Meanwhile, the caricature generating apparatus according to the present disclosure does not necessarily have to be implemented based on an Internet server, and may be implemented by a stand-alone computer or a server accessible only to a small number of closed user groups.

Figure 2:
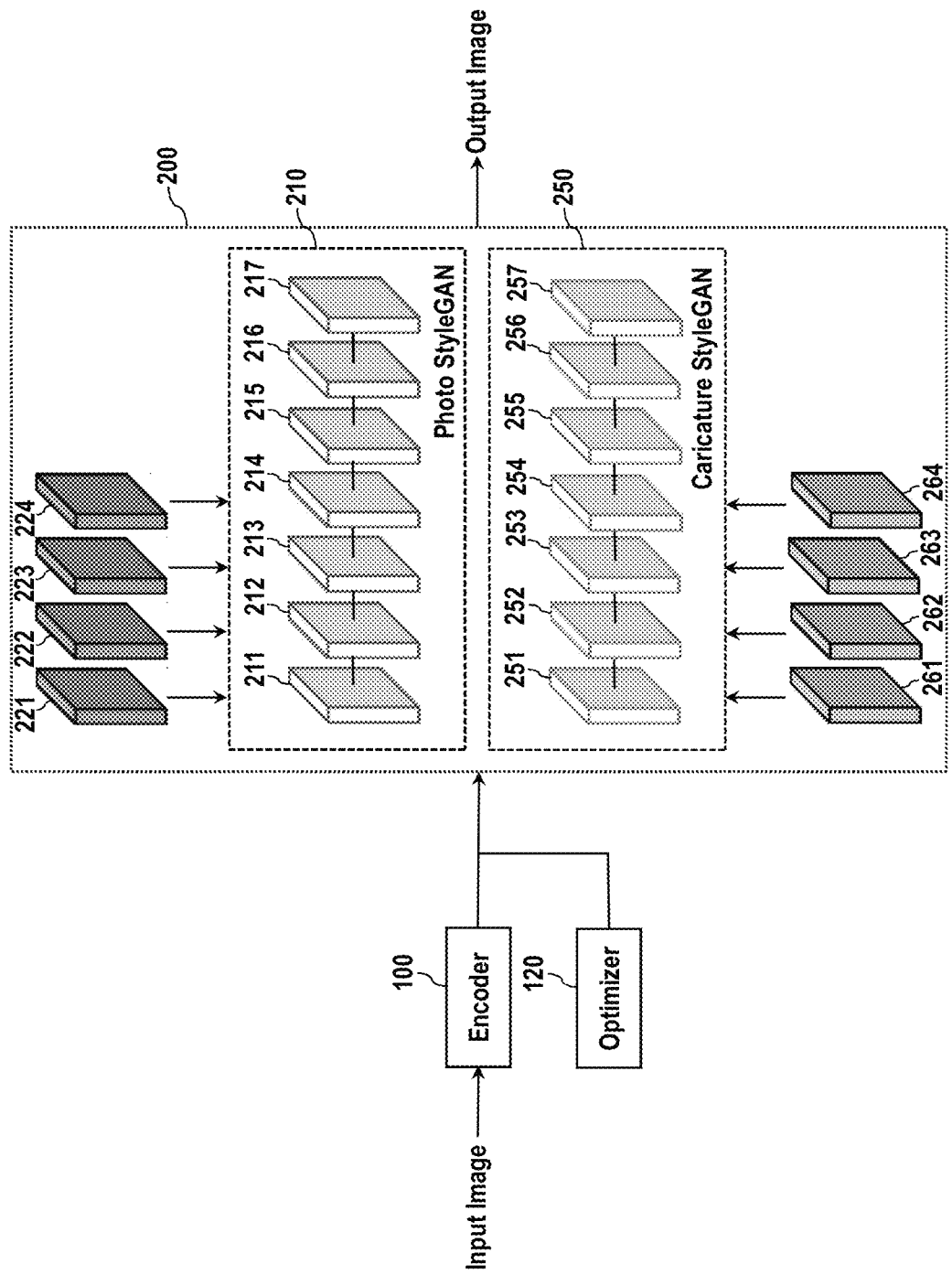
FIG. 2 is a schematic block diagram of the caricature generating apparatus according to an exemplary embodiment of the present disclosure.

FIG. 2 is a block diagram of the caricature generating apparatus according to an exemplary embodiment of the present disclosure. The caricature generating apparatus may include an encoder 100, an optimizer 120, and a generation network 200.

The encoder 100 may receive the input photograph and encode the input photograph to generate a latent code (hereinbelow, referred to as 'W+ latent code') representing the input photograph. The encoding performed by the encoder 100 may be a compression operation including a feature map extraction performed through a plurality of convolutional operations. Alternatively, the W+ latent may be obtained from the photograph by a photo-to-latent embedding However, the present disclosure is not limited thereto, and in another alternative embodiment, the encoding operation may include training of the encoder 100 and mapping the given input photograph into a corresponding W+ latent code.

The optimizer 120 may select a random number generated according to a Gaussian distribution (i.e., a normal distribution) and obtain a W+ latent code optimized such that a difference from the given input image is minimized. According to an exemplary embodiment, the optimizer 120 and the encoder 100 may be used selectively. For example, the encoder 100 may be actively used when the caricature generating apparatus actually operates for an inference or when shape exaggeration blocks 221-224 and 261-264 of the generation network 200 are trained, but the optimizer 120 may be actively used to train a caricature generation network 210 and a photo reconstruction network 250 of the generation network 200. Accordingly, even though both the encoder 100 and the optimizer 120 generates the W+ latent code and provides the code to the generation network 200, the timings at which the encoder 100 and the optimizer 120 provide the W+ latent code may be different from each other. On the other hand, the encoder 100 may provide the generation network 200 with a feature map, a compressed photograph, or a caricature image to instead of the W+ latent code alternatively.

The generation network 200 may receive the W+ latent code and generate multiple-scale feature maps and eventually the output caricature image. In addition, when the W+ latent code is associated with a caricature, the generation network 200 may reconstruct the photograph corresponding to the caricature from the W+ latent code. In an exemplary embodiment, the generation network 200 may include the caricature generation network 210, the photo reconstruction network 250, and a plurality of shape exaggeration blocks 221-224 and 261-264. The generation network 200 may further include a plurality of discriminators suitable for calculating loss functions as will be described later.

The caricature generation network 210 may be trained to receive the W+ latent code for the photographic image and generate the caricature corresponding to the W+ latent code. The caricature generation network 210 may include a plurality of caricature generation learning layers 211-217. Each of the plurality of caricature generation learning layers 211-217 may be configured to include two convolutional layers, two activation layers, an upsampling layer, and an affine transformation layer, and may double the size of an input feature map horizontally and vertically.

The photo reconstruction network 250 may be trained to receive the W+ latent code for the caricature image and reconstruct the photograph corresponding to the W+ latent code. The photo reconstruction network 250 may be configured similarly to the caricature generation network 210 and may include a plurality of photo reconstruction learning layers 251-257. Each of the plurality of photo reconstruction learning layers 251-257 may be configured to include two convolutional layers, two activation layers, an up sampling layer, and an affine transformation layer, and may double the size of an input feature map horizontally and vertically.

The shape exaggeration blocks 221-224 and 261-264 may exaggerate the facial shape in the input image. Each of the shape exaggeration blocks 221-224 and 261-264 may be configured to include two convolutional layers and two activation layers and may output a feature map having a same size as the input feature map. As will be described below, the shape exaggeration block may achieve the shape exaggeration by receiving as an input a feature map in a feature space handling the shape among feature spaces generated by a generative adversarial network (GAN) and transforming the feature map.

Figure 3:
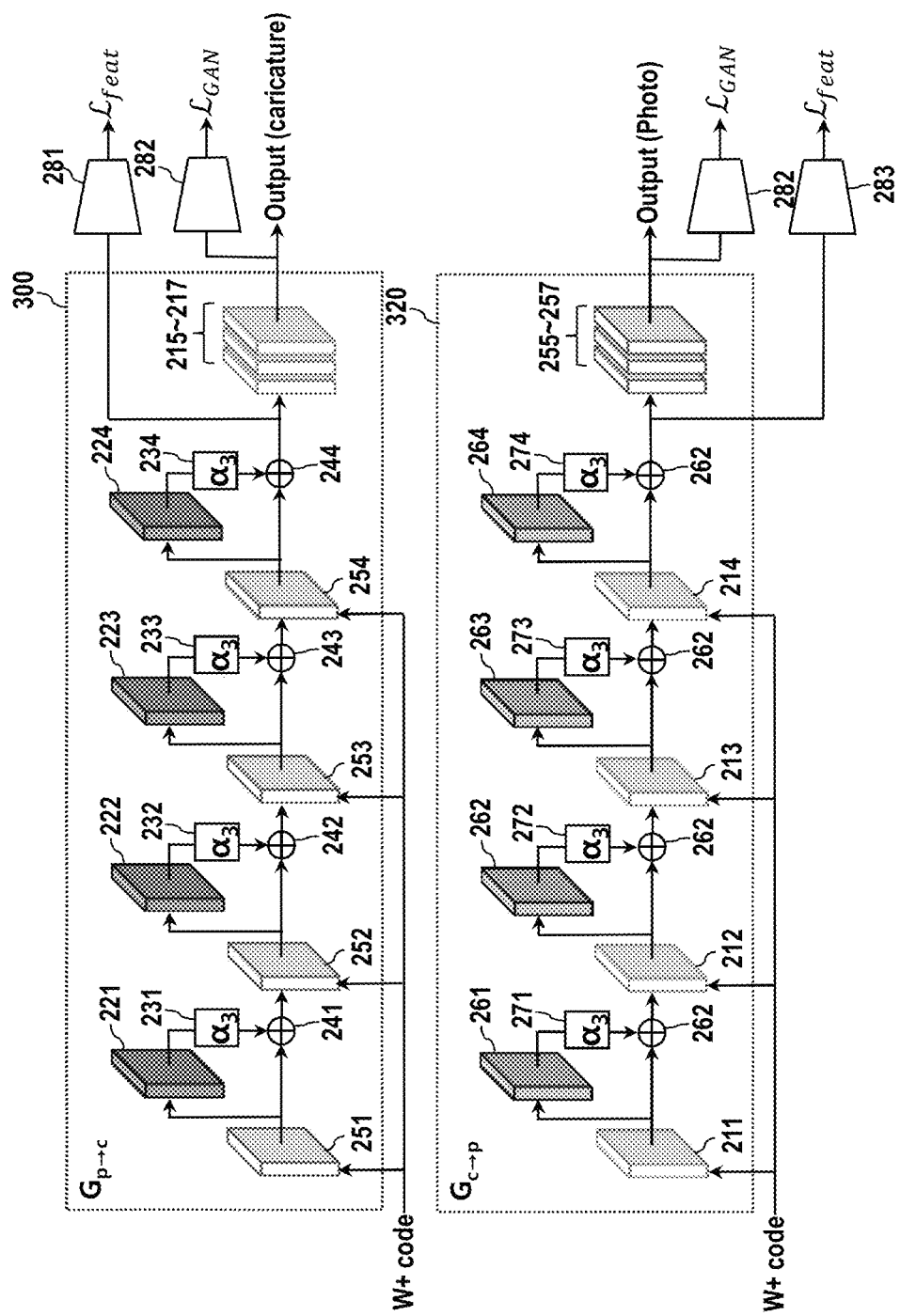
FIG. 3 is a block diagram showing an arrangement of components during operations of training and inference of a shape exaggeration block shown in FIG. 2.

FIG. 3 is a block diagram showing an arrangement of components during operations of training and inference of the shape exaggeration block.

The generation network 200 shown in FIG. 2 may be trained in two steps. First, caricature generation learning layers 211-217 of the caricature generation network 210 and photo reconstruction learning layers 251-257 of the photo reconstruction network 250 may be trained in an arrangements shown in FIG. 2. After the training of the caricature generation learning layers 211-217 and the photo reconstruction learning layers 251-257 is completed, some caricature generation learning layers (e.g., 215-217) and corresponding photo reconstruction learning layers (e.g., 255-257) are swapped, or exchanges their positions with each other. In this swapped state, the shape exaggeration blocks 221-224 and 261-264 may be trained, and then the caricature generating apparatus may perform the inference operation for the input image.

The layer swapping and a resulting change in the network architecture will be described in more detail. The generation network 200 shown in FIG. 2 may include two generation networks, i.e., the caricature generation network 210 and the photo reconstruction network 250 as mentioned above. Through a pre-training, the photo reconstruction network 250 may be trained to generate a photograph, and the caricature generation network 210 is finely tuned from the photo reconstruction network 250 to generate the caricature image from the photograph. After the pre-training, the layers of the caricature generation network 210 and the photo reconstruction network 250 are fixed and not updated during the inference process. The caricature generation network 210 trained to generate the caricature image may be referred to as a 'caricature StyleGAN', and the photo reconstruction network 250 trained to reconstruct the normal face photograph may be referred to as a 'photo StyleGAN'.

When the training of the caricature generation network 210 and the photo reconstruction network 250 is completed in this way and kernels of the layers in the networks 210 and 250 are fixed, some layers of the two networks 210 and 250 are exchanged to construct layer-mixed models that generates the caricature image or the photographic image from the latent code.

Each of the caricature generation network 210 and the photo reconstruction network 250 shown in FIG. 2 has a structure similar to a StyleGAN network which is one of generative adversarial networks. Generally, the generative adversarial network (GAN), which is one of machine learning schemes and also referred to as a 'adversarial generative network', includes a generator model and a discriminator model. The generator model is trained to learn a probability distribution and deceive the discriminator model as much as possible by creating a fake example based on the probability distribution. The discriminator model is trained to discriminate different sets and, in particular, to distinguish the fake example presented by the generator model from a real example as accurately as possible. The process of training the generator model to deceive the discriminator model is referred to as an adversarial process. The adversarial process in which the generator model and the discriminator model compete may enable to generate an image or voice that is close to a reality.

The caricature generation network 210 has a property that coarse layers that generate low-resolution feature maps may mainly act as a generation module for a structure synthesis and fine layers that generate high-resolution feature maps may mainly act as a generation module for a texture generation. In other words, the layers of the caricature generation network 210 may be divided into layers mainly handling the structure of the output and the layers handling the texture of the output. In consideration of this property, a network actually creating the caricature may be configured to include the coarse layers generating the low-resolution feature maps which are pre-trained to handle photograph-associated feature maps in the photo reconstruction network 250, and the fine layers generating the high-resolution feature maps which are pre-trained to handle caricature-associated feature maps in the caricature generation network 210. The network configured in this way is a first layer-mixed network 300 in FIG. 3. In the first layer-mixed network 300, the shape exaggeration blocks 221-224 may receive feature maps from the coarse layers, modulates the feature maps to output modulation feature maps to be added to the feature maps from the coarse layers in order to achieve the shape exaggeration.

Specifically, in the first layer-mixed network 300, coarse layers (i.e., layers of low resolution) 251-254 are from the photo StyleGAN 250 to control the overall structural and identity information of the output caricature, and fine layers (i.e. layers of high resolution) layers 211-214 are from the caricature StyleGAN 210 to create detailed color styles for a caricature. The first layer-mixed network 300 including the coarse layers pre-trained in the photo StyleGAN 250 and the fine layers pre-trained in the caricature StyleGAN 210 may generate a caricature image having a caricature texture while preserving structural identity of the face in the photographic image. In fact, the layer swapping may be performed by changing or copying parameters and weights (i.e., kernels) of the layers.

The shape exaggeration blocks 221-224 include convolutional layers that produce additive feature modulation maps for the coarse layers of the first layer-mixed network 300. Each of the shape exaggeration blocks 221-224 takes a feature map of size $n^2$ and creates a $n^2$ feature modulation map which is added back to the input feature map, similarly to a residual learning [Kaiming He, Xiangyu Zhang, Shaoqing Ren, and Jian Sun. 2016a. Deep residual learning for image recognition. In *Proc. CVPR*]. The modulated feature map is then fed to a next layer that creates a higher resolution feature map to handle finer-scale structures. The shape exaggeration blocks 221-224 are trained to achieve two goals: introduction of shape deformations that resemble real caricatures and preservation of important visual features from the input photograph. The loss functions used to train the shape exaggeration blocks 221-224 will be described below. The shape exaggeration blocks 221-224 enables the shape exaggeration by providing the additive feature modulation maps for the coarse layers. While the shape exaggeration blocks 221-224 are being trained, the kernels or weights of the layers 251-254 and 215-217 are fixed as mentioned above. The shape exaggeration blocks 221-224 may be configured in the form of residual blocks.

As such, the shape exaggeration blocks 221-224 are trained by a supervised learning method specially designed for the photo-to-caricature translation to introduce a feature map modulation through the realistic and identity-preserving caricature exaggeration. The shape exaggeration blocks 221-224 may implicitly increase a deviation from an average facial geometry in the feature space since the model is trained using the GAN loss to generate highly diverse caricature geometries. The deviation may distinctly reflect the features of the input owing to the cyclic consistency and the attribute matching losses.

Figure 8:
FIG. 8 shows examples of output caricature images according to boundaries of a layer swapping.

In the layer swapping, it may be important to choose a proper boundary between the coarse layers and the fine layers. FIG. 8 shows examples of output caricature images according to boundaries of the layer swapping. In the drawing, p denotes a number of the coarse layers in the first layer-mixed network 300 copied or swapped from the photo StyleGAN, and c denotes a number of the fine layers in the first layer-mixed network 300 copied or swapped from the caricature StyleGAN. For example, 'p=4, c=3' denotes a case where the first four low-resolution layers are taken from the photo StyleGAN 250 and the last three fine-resolution layers are taken from the caricature StyleGAN 210. A change in the boundary selection may result in a change in the facial structure preservation and a style of details in the output caricature. Specifically, as p decreases, the facial structure of the input is deformed and the identity is lost in the output caricature. One of goals in selection of the boundary is to enable the layer-mixed model to generate the caricature image faithful to the input photograph in terms of the facial structure and the identity. Empirically, the condition of 'p=4, c=3' denoting a choice of a first four scales ($4^2$~$32^2$) as the coarse layers and the rest as the fine layers was chosen for the layer-mixed model allowing sufficient styling of details while maintaining the facial structure. It can be seen, in FIG. 4, that taking more than three fine layers from the caricature StyleGAN would introduce excessive shape deformations, which may change the visual appearance of the input photograph.

As mentioned earlier, the parameters of the copied layers are not updated further after the layer swapping. That is, no additional end-to-end fine-tuning is applied to the layer-mixed model since the coarse layers 251-254 and the fine layers 215-217 of the model already have desired properties required for handling the facial shapes and detailed styles. The only components trained in the first layer-mixed network 300 are the shape exaggeration blocks 221-224 appended to the coarse layers 251-254.

To train the shape exaggeration blocks 221-224, another layer-mixed network is defined for a caricature-to-photo translation to enable a cyclic training. In detail, a second layer-mixed network 320 is configured by taking first four coarse layers 211-214 from the caricature StyleGAN 210 and the remaining fine layers 255-257 from the photo StyleGAN 250. The second layer-mixed network 320 may be denoted by a c2p model or a c-p model while the original first layer-mixed network 300 which is a backbone of the generation network of the present disclosure may be denoted by a p2c model or a p-c model. The generation network according to the present disclosure, in particular, the first layer-mixed network 300 may be referred to as StyleCariGAN.

In an exemplary embodiment, one of the key elements for the photo-to-caricature translation is the shape exaggeration blocks 221-224. Four shape exaggeration blocks 221-224 are provided in the p2c network 300. The shape exaggeration blocks 221-224 are constructed based on convolutional layers that generates the additional feature modulation maps for the coarse layers 251-254 of the StyleCariGAN. Each of the shape exaggeration blocks receives a feature map of size $n^2$ and generates a feature modulation map of size $n^2$ that is added back to the input feature map similarly to the residual learning. Then, the modulated feature map is fed to the next layer, through respective one of the adders 241-244, that generates a higher resolution feature map to handle a finer-scale structure. The adders 241-242 are operators that add corresponding elements to each other.

That is, a first shape exaggeration block 221 may receive a feature map having a size $4^2$ output by the layer 251 and generate a feature modulation map having a size of $4^2$. The adder 241 may add the feature modulation map from the first shape exaggeration block 221 to an output of the layer 251 to output a modulated feature map to a layer 252. A second shape exaggeration block 222 may receive a feature map having a size $8^2$ output by the layer 252 and generate a feature modulation map having a size of $8^2$. The adder 242 may add the feature modulation map from the second shape exaggeration block 222 to output a modulated feature map to a layer 253. A third shape exaggeration block 223 may receive a feature map having a size $16^2$ output by the layer 253 and generate a feature modulation map having a size of $16^2$. The adder 243 may add the feature modulation map from the third shape exaggeration block 223 to an output of the layer 251 and output a modulated feature map to a layer 254. A fourth shape exaggeration b lock 224 may receive a feature map having a size $32^2$ output by the layer 254 and generate the feature modulation map having a size of $32^2$. The adder 244 may add the feature modulation map from the fourth shape exaggeration block 224 to output a modulated feature map to a layer 215. Finally, the layer 217 outputs a feature map of size $256^2$. The c2p network 320 provided for the cyclic consistency is also configured similarly to the p2c network 300, and includes four shape exaggeration blocks 261-264.

Figure 4:
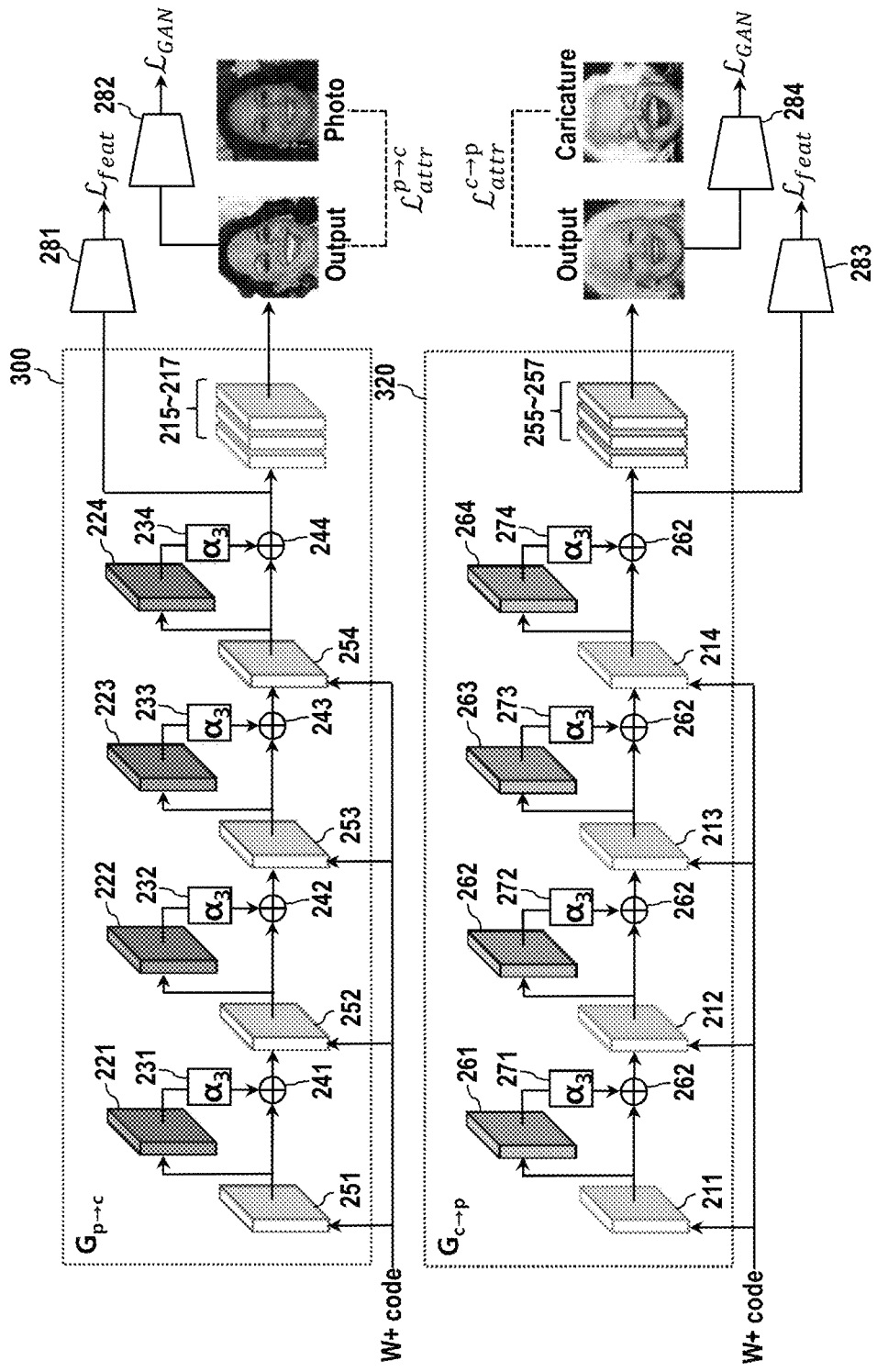
FIG. 4 shows losses used as objective function for training the shape exaggeration blocks.

FIG. 4 shows losses used as objective function for training the shape exaggeration blocks. The shape exaggeration blocks are trained to achieve two goals. The first goal is to introduce shape deformations that resemble real caricatures, which may be achieved by two types of generative adversarial losses: $\mathcal{L}_{f\ eat}$ and $\mathcal{L}_{GAN}$. The second goal is to preserve important visual features from the input photograph, which may be achieved by three losses: a feature map cyclic consistency loss $\mathcal{L}_{fcyc}$, an identity cyclic consistency loss $\mathcal{L}_{icyc}$, and an attribute matching loss $\mathcal{L}_{attr}$. That is, in order to achieve the exaggeration that is realistic cut preserves the features of the face, the shape exaggeration blocks are trained using the generative adversarial losses $\mathcal{L}_{feat}$ and $\mathcal{L}_{GAN}$, the cyclic consistency losses $\mathcal{L}_{fcyc}$ and $\mathcal{L}_{icyc}$, and the attribute matching loss $\mathcal{L}_{attr}$.

First, a final output of the generation network equipped with the shape exaggeration blocks should look like a caricature. To achieve this goal, a training method utilizing the generative adversarial network is used for the training of the shape exaggeration blocks at a training time for the generation network. In detail, a discriminator is trained to distinguish a real caricature from a caricature created by the generation network. Contrarily, the generation network including the shape exaggeration blocks is trained to deceive the discriminator so that the discriminator may classify the generated caricature as the real caricature. As the adversarial learning progresses, the generation network may generate an output that looks like the real caricature.

To facilitate the adversarial learning, another discriminator that discriminates the modulated feature maps is used in addition to a discriminator that discriminates the output images. Such a discriminator is trained to discriminate the modulated feature maps generated based on feature modulation maps from the shape exaggeration blocks from the caricature shape feature maps generated by the pre-trained layers. The shape exaggeration blocks may be trained to deceive the discriminator and contribute to generate the modulated feature maps indistinguishable from the feature maps caricature shape feature maps.

In other words, two discriminators are introduced to apply the adversarial learning to the final image as well as the modulated feature maps. Non-saturating logistic loss [Ian J Goodfellow, Jean Pouget-Abadie, Mehdi Mirza, Bing Xu, David Warde-Farley, Sherjil Ozair, Aaron Courville, and Yoshua Bengio. 2014. Generative adversarial networks. In Proc. NeurIPS] is used with R1 regularization [Lars Mescheder, Andreas Geiger, and Sebastian Nowozin. 2018. Which training methods for GANs do actually converge?. In Proc. ICML] for both the final images and the modulated feature maps, and a total adversarial loss $\mathcal{L}_{adv}$ is calculated as a sum of the two losses as shown in Equation 1.

$$\mathcal{L}_{adv} = \mathcal{L}_{feat} + \lambda_{GAN} \mathcal{L}_{GAN} \qquad \text{[Equation 1]}$$

where $\mathcal{L}_{feat}$ and $\mathcal{L}_{GAN}$ are the losses on feature maps and final images, respectively.

The cyclic consistency losses may be used to guide the generation network to generate the caricatures that resembles the input photographs. When the shape exaggeration blocks generate caricature shape feature maps from the input facial feature maps and then shape de-exaggeration blocks reconstruct facial shape feature maps from the caricature shape feature maps, the cyclic consistency losses may constrain that the reconstructed facial shape feature maps are the same as the input facial feature maps. Similarly, when the shape de-exaggeration blocks reconstruct the facial shape feature maps from the caricature shape feature maps and then the shape exaggeration blocks generate the caricature shape feature maps from the reconstructed facial feature maps, the cyclic consistency losses may constrain that the caricature shape feature maps are the same as the original caricature shape feature maps.

Measurement of the cyclic consistency losses may require a network creating the caricature from a facial photograph and a network reconstructing the facial photograph from a corresponding caricature. The network that reconstructing the facial photograph from the corresponding caricature may be configured to include coarse layers pre-trained to handle caricature-associated feature maps in the caricature generation network 210 and fine layers pre-trained to handle photograph-associated feature maps in the photo reconstruction network 250. In addition, shape de-exaggeration blocks performing functions opposite to those of the shape exaggeration blocks are attached to respective coarse layers.

The cyclic consistency for the modulated feature maps and the cyclic consistency for the image are referred to as a feature map cyclic consistency $\mathcal{L}_{fcyc}$ and an identity cyclic consistency consistency $\mathcal{L}_{icyc}$, respectively. The feature map cyclic consistency $\mathcal{L}_{fcyc}$ allows an effect of the shape exaggeration blocks to be invertible with a cycle at each feature map scale. The shape exaggeration blocks for p2c-StyleCariGAN define the photo-to-caricature feature modulation $S_{p \to c}$. The corresponding blocks in c2p-StyleCariGAN define the caricature-to-photo feature modulation $S_{c \to p}$. That is, the blocks in c2p-StyleCariGAN performs an inverse operation of the exaggeration and reverts the exaggerated shape into a regular shape. These blocks may be referred to as shape de-exaggeration blocks. Using the two feature modulation, the feature map cyclic consistency loss $\mathcal{L}_{fcyc}$, may be defined by Equation 2.

$$\mathcal{L}_{fcyc}^{p \to c} = \sum_{i=1}^{4} \left( \mathbb{E}_{\mathcal{F}_p^i \sim G_p^i(w)} [\| S_{c \to p}^i (S_{p \to c}^i (\mathcal{F}_p^i)) - \mathcal{F}_p^i \|_2] \right), \qquad \text{[Equation 2]}$$

$$\mathcal{L}_{fcyc}^{c \to p} = \sum_{i=1}^{4} \left( \mathbb{E}_{\mathcal{F}_c^i \sim G_c^i(w)} [\| S_{p \to c}^i (S_{c \to p}^i (\mathcal{F}_c^i)) - \mathcal{F}_c^i \|_2] \right),$$

$$\mathcal{L}_{fcyc} = \mathcal{L}_{fcyc}^{p \to c} + \mathcal{L}_{fcyc}^{c \to p}$$

where $F_c^i$ is a caricature feature map generated by i-th block $G_c^i$ of the caricature StyleGAN, $F_p^i$ is a photo feature map generated by i-th block $G_p^i$ of the photo StyleGAN, $S_{p \to c}^i$ is an i-th photo-to-caricature shape exaggeration block, and $S_{c \to p}^i$ is a i-th caricature-to-photo shape de-exaggeration block.

The identity consistency forces the effect of the shape exaggeration blocks to be invertible with a cycle by inspecting photographs generated from the feature maps. By designing the identity consistency loss $\mathcal{L}_{icyc}$ based on a face embedding network trained on photographs, the identity consistency is calculated only for the cycle starting from the photo feature maps. Using the face embedding network, the identity consistency loss $\mathcal{L}_{icyc}$ is designed as a $L_2$ distance between two embeddings: 1) the face embedding of the starting photograph and 2) the face embedding of the cycle-reconstructed photograph generated using the coarse feature maps modulated by $S_{p \to c}$ and $S_{c \to p}$ sequentially.

Figure 5:
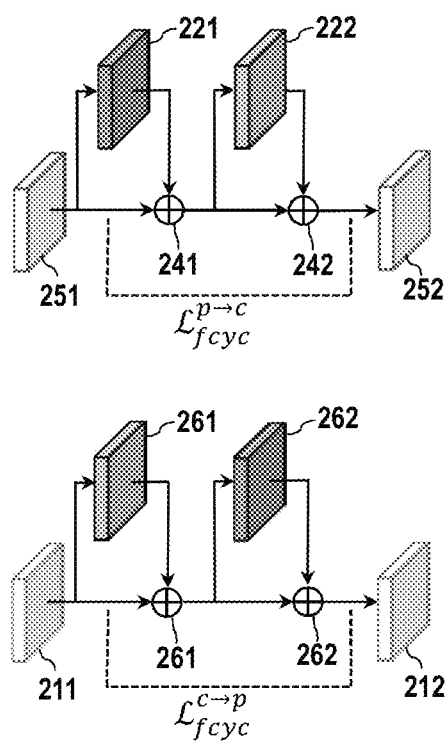
FIG. 5 illustrates an example of arrangement of generation learning layers and shape exaggeration blocks for determining a feature map cyclic consistency loss.

FIG. 5 illustrates an example of arrangement of the generation learning layers and the shape exaggeration blocks for determining the feature map cyclic consistency loss. Since the photo-to-caricature mapping and the caricature-to-photo mapping according to the present disclosure are feature-map-to-feature-map mappings, the cyclic consistency does not require a caricature-to-feature-map encoder. The mappings do not take an image as the input, and the feature maps may be used directly to implement the cyclic consistency loss.

Finally, the cyclic consistency loss $\mathcal{L}_{cyc}$ may be computed by Equation 3.

$$\mathcal{L}_{cyc} = \mathcal{L}_{fcyc} + \lambda_{icyc} \mathcal{L}_{icyc} \qquad \text{[Equation 3]}$$

Even with the cyclic consistency, the resultant exaggeration is not guaranteed to preserve important features of the input photographs. To constrain the shape exaggeration blocks to produce valid caricature deformations, facial attribute classifiers for photographs and caricatures are used. One of the classifiers is a trained facial feature classifier for the general facial photograph image, and the other one of the classifiers is a trained facial feature classifier for the caricature. Facial attributes are extracted for the input photographic image and a resultant caricature using these pre-trained facial feature classifiers, and an objective function is defined in a form of a binary cross entropy loss. For the shape de-exaggeration blocks, the facial attributes may be extracted for the input caricature and the resultant photographic image symmetrically. The p2c-StyleCariGAN may be constrained to create a caricatures with the same attributes as the input photograph. A similar attribute matching may be applied to the c2p-StyleCariGAN. The attribute matching loss $\mathcal{L}_{attr}$ is defined using the binary cross entropy losses between the photographic attributes and the caricature attributes.

$$\mathcal{L}_{attr}^{p \to c} = -\mathbb{E}_{w \sim W}[\phi_p(G_p(w))\log \phi_c(G_{p \to c}(w)) + (1-\phi_p(G_p(w)))\log(1-\phi_c(G_{p \to c}(w)))],$$

$$\mathcal{L}_{attr}^{c \to p} = -\mathbb{E}_{w \sim W}[\phi_c(G_c(w))\log \phi_p(G_{c \to p}(w)) + (1-\phi_c(G_c(w)))\log(1-\phi_p(G_{c \to p}(w)))],$$

$$\mathcal{L}_{attr} = \mathcal{L}_{attr}^{p \to c} + \mathcal{L}_{attr}^{c \to p} \quad \text{[Equation 4]}$$

where $\phi_p$ is a photographic attribute classifier, $\phi_c$ is a caricature attribute classifier, $G_p$ is the photo StyleGAN, $G_c$ is the caricature StyleGAN, $G_{p \to c}$ is p2c-StyleCariGAN, and $G_{c \to p}$ c2p-StyleCariGAN.

To summarize, a full objective function for training is expressed by Equation 5.

$$\mathcal{L}_G = \lambda_{adv}\mathcal{L}_{adv} + \lambda_{cyc}\mathcal{L}_{cyc} + \lambda_{attr}\mathcal{L}_{attr} \quad \text{[Equation 5]}$$

where $\lambda_{adv}$, $\lambda_{cyc}$, and $\lambda_{attr}$ are constants defining weights of the losses.

The shape exaggeration blocks allow multi-scale deformation controls for the generated images. Since the blocks perform the modulation on four feature maps representing respective spatial scales, the degrees of modulation of the blocks may be freely varied by simply applying a scale factor to the output of each block thereby changing the degree of exaggeration. For example, in order to reduce an overall deformation of the facial shape, a scale factor smaller than 1 may be applied to an output of the first shape exaggeration block before the output of the first shape exaggeration block is added to the original feature map. To eliminate wrinkles due to an extreme deformation, the output of the third or fourth shape exaggeration block may be multiplied by zero or a small scale factor.

Figure 6:
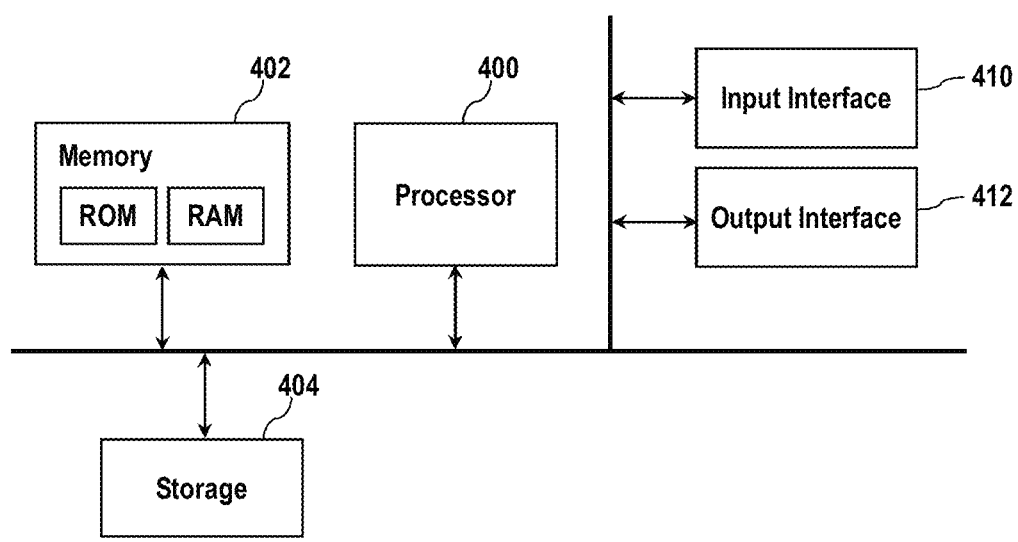
FIG. 6 is a block diagram showing a physical configuration of an embodiment of the caricature generating apparatus shown in FIG. 2.

FIG. 6 is a block diagram showing a physical configuration of an embodiment of the caricature generating apparatus shown in FIG. 2. The caricature generating apparatus may include a processor 400, a memory 402, and a storage 404. In addition, the caricature generating apparatus may further include an input interface device 410 and an output interface device 412. The components of the caricature generating apparatus may be connected to each other by a bus.

The processor 400 may execute program instructions stored in the memory 402 or the storage 404 to perform the caricature generating method according to the present disclosure. The processor 400 may include a central processing unit (CPU) or a graphics processing unit (GPU), or may be implemented by another kind of dedicated processor suitable for performing the method of the present disclosure. The memory 402 may load the program instructions stored in the storage 404 to provide to the processor 400 so that the processor 400 may execute the program instructions. The memory 402 may include, for example, a volatile memory such as a read only memory (ROM) and a nonvolatile memory such as a random access memory (RAM). In addition, the memory 402 may temporarily store the photographic image, the caricature image, the kernel weights, and the feature map data, as well as data generated in the course of the execution of the program instructions for the caricature generation.

The storage 404 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD). The program instructions stored in the storage 404 is suitable for implementing the caricature generating method according to the present disclosure. In addition, the data stored in the storage 404 may include data that needs to be stored for a long time, e.g., the kernel weights and the feature map data.

Figure 7:
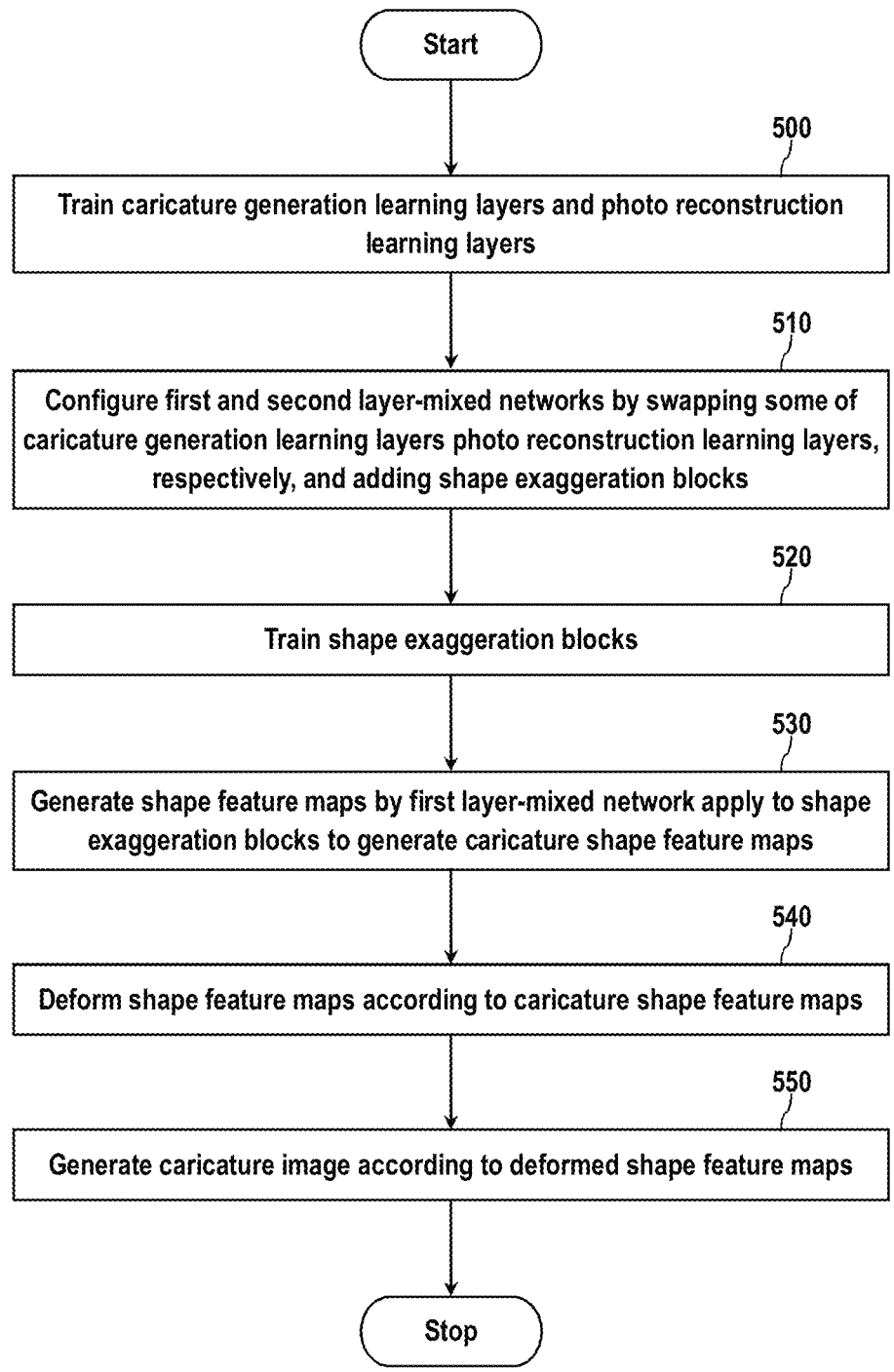
FIG. 7 is a flowchart showing the caricature generating method according to an exemplary embodiment of the present disclosure.

FIG. 7 is a flowchart showing the caricature generating method according to an exemplary embodiment of the present disclosure.

The caricature generation learning layers 211-217 of the caricature generation network 210 and the photo reconstruction learning layers 251-257 of the photo reconstruction network 250 are trained first (operation 500).

When the training of the caricature generation learning layers 211-217 and the photo reconstruction learning layers 251-257 is completed, some of the caricature generation learning layers 211-217 and the photo reconstruction learning layers 261-267 are swapped to configure the first and second layer-mixed networks 300 and 320 (operation 510). In addition, the shape exaggeration blocks 221-224 and 261-264 are added to the first layer-mixed network 300 and the second layer-mixed network 320, respectively, so that the first layer-mixed network 300 includes the shape exaggeration blocks 221-224, and the second layer-mixed network 320 includes the shape exaggeration blocks 261-264. The shape exaggeration blocks 221-224 and 261-264 are trained subsequently (operation 520).

After the training of the shape exaggeration blocks 221-224 and 261-264 is completed, the shape feature maps are generated by the first layer-mixed network 300 and applied to the shape exaggeration blocks 221-224, so that the caricature shape feature maps are generated (operation 530). Afterwards, the caricature shape feature maps are applied to the first layer-mixed network 300 to deform the shape feature maps according to the caricature shape feature maps (operation 540). Then, the texture is changed by the fine layers of the first layer-mixed network 300. Next, the caricature image is generated according to the deformed shape feature maps (operation 550).

Experiments and Evaluations

The caricature generating apparatus was built based on four NVIDIA Quadro RTX 8000 (48 GB) GPUs. As mentioned above, each the shape exaggeration blocks includes two convolutional layers, and each convolutional layer has a leaky ReLU as an activation function. Each convolutional layer has kernel size=3, stride=1, and padding=1. The leaky ReLU layers have a negative slope of 0.2.

An Adam optimizer was used in PyTorch with $\beta 1=0$, $\beta 2=0.99$ and learning rate 0.002. Each mini-batch of batch size 32 consists of randomly generated photographs and caricatures. The training was stopped after 1,000 iterations. The weights for the losses were set empirically to $\mathcal{L}_{adv}=1$, $\mathcal{L}_{GAN}=10$, $\mathcal{L}_{cyc}=10$, $\mathcal{L}_{icyc}=1000$, and $\mathcal{L}_{attribute}=10$. The training time using the four NVIDIA Quadro RTX 8000 (48 GB) GPUs was about 8 hours.

Both the caricature StyleGAN and the photo StyleGAN used the architecture and training algorithm of StyleGAN2 disclosed in [Tero Karras, Samuli Laine, Miika Aittala, Janne Hellsten, Jaakko Lehtinen, and Timo Aila. 2020b. Analyzing and improving the image quality of stylegan. In Proc. ICCV]. The photo StyleGAN was trained on the FFHQ dataset disclosed in [Tero Kanas, Samuli Laine, and Timo Aila. 2019. A style-based generator architecture for generative adversarial networks. In Proc. CVPR] resized to 256× 256 resolution. The caricature StyleGAN was fine-tuned from a photographic model with caricature in WebCaricature [Jing Huo, Wenbin Li, Yinghuan Shi, Yang Gao, and Hujun Yin. 2017. Webcaricature: a benchmark for caricature recognition. arXiv (2017)] using FreezeD [Sangwoo Mo, Minsu Cho, and Jinwoo Shin. 2020. Freeze Discriminator: A Simple Baseline for Fine-tuning GANs. arXiv (2020)] and ADA [Tero Karras, Miika Aittala, Janne Hellsten, Samuli Laine, Jaakko Lehtinen, and Timo Aila. 2020a. Training generative adversarial networks with limited data. In Proc. NeurIPS]. The Web Caricature dataset was aligned using five landmarks (i.e., center of two eyes, tip of nose, and two corners of mouth) and resized to 256×256. The Py Torch implementation was used to train both the models. A pre-trained FaceNet [Florian Schroff, Dmitry Kalenichenko, and James Philbin. 2015. Facenet: A unified embedding for face recognition and clustering. In Proc. CVPR] as the face embedding network.

Two attribute classifiers for photos and caricatures, respectively, are needed to implement the attribute matching loss $\mathcal{L}_{attr}$. The attribute classifiers were trained using the Web CariA dataset [Wen Ji, Kelei He, Jing Huo, Zheng Gu, and Yang Gao. 2020. Unsupervised domain attention adaptation network for caricature attribute recognition. In Proc. ECCV], which provides labels for both photographs and caricatures. The inventors found that the label distributions of photographs and caricatures were quite similar in the dataset. The backbone architecture of the attribute classifiers was ResNet-18 [Kaiming He, Xiangyu Zhang, Shaoqing Ren, and Jian Sun. 2016a. Deep residual learning for image recognition. In Proc. CVPR] with the only change in the output channel size of the last fully connected layer. The output channel size was 50, which is a number of attributes in the Web CariA dataset. The pre-trained ResNet-18 provided by Py Torch was pre-tuned. The test accuracy on the test set of the WebCariA dataset was 85% for photos and 82% for caricatures.

In test time, the GAN inversion from an input photograph to the latent code takes three to four minutes. After the inversion, it took about 40 miliseconds (ms) to generate the caricature image. The measurement was done on a server with NVIDIA Quadro RTX 8000 and Intel Xeon Gold 6226R. Both the input photograph and the output caricature had a size of 256×256.

Figure 9:
FIG. 9 shows a result of comparing the method according to an exemplary embodiment of the present disclosure with other state-of-the-art methods for image-to-image translation.

The caricature generating method according to the present disclosure was qualitatively evaluated by comparing two types of methods: generic image-to-image translation models and caricature generation methods by deep learning. FIG. 9 shows a result of comparing the method according to an exemplary embodiment of the present disclosure with other state-of-the-art methods for image-to-image translation. The method according to an exemplary embodiment can deform and stylize the input facial photograph to produce more realistic and detailed caricatures in comparison to other methods. (Note: All input images are copyrighted to Jordan Strauss/Invision/AP, AF archive/Alamy Stock Photo, Stuart C. Wilson/Getty Images, WENN Rights Ltd/Alamy Stock Photo, Danny Moloshok/Invision/AP, or Slaven Vlasic/Getty Images).

Among various image-to-image translation models, U-GAT-IT [Junho Kim, Minjae Kim, Hyeonwoo Kang, and Kwanghee Lee. 2020. U-GAT-IT: unsupervised generative attentional networks with adaptive layer-instance normalization for image-to-image translation. In Proc. ICLR] and StarGAN v2 [Yunjey Choi, Youngjung Uh, Jaejun Yoo, and Jung-Woo Ha. 2020. StarGAN v2: Diverse image synthesis for multiple domains. In Proc. CVPR] exhibited visually satisfactory results when translating two domains with large shape changes. U-GAT-IT and StarGAN v2 were trained from scratches on the WebCaricature dataset using their official implementation programs. U-GAT-IT did not successfully generate caricatures from the input photographs but produced blurry images. Sometimes the changes in the output compared to the input was insignificant. StarGAN v2 produced more stable results, but sometimes artifacts were found in textures. Besides, the degree of exaggeration was smaller than that of the present disclosure. WarpGAN [Yichun Shi, Debayan Deb, and Anil K Jain. 2019. WarpGAN: Automatic caricature generation. In Proc. CVPR] and Auto-Toon [Julia Gong, Yannick Hold-Geoffroy, and Jingwan Lu. 2020. AutoToon: Automatic Geometric Warping for Face Cartoon Generation. In Proc. WACV] are state-of-the-art methods for generating caricatures based on deep learning. Pre-trained models of WarpGAN and AutoToon models released by the authors were used in the comparison. Similarly to U-GAT-IT and StarGAN v2, WarpGAN was trained on the Web Caricature dataset. In contrast, AutoToon was trained on its own dataset containing of photograph and caricature pairs for supervised learning.

As can be seen in FIG. 9, these deep learning-based caricature generating methods may enable large shape changes using explicit 2D image deformations. However, the generated shape deformations do not provide enough details to create realistic caricatures. WarpGAN uses only 16 sparse control points to handle deformations, and AutoToon is trained with only 101 photograph-caricature pairs. The limited density of control points and the scarcity of training samples may make it difficult to generalize these methods to generate realistic caricatures. Contrarily, when visually inspected, the results of the method according to the present disclosure are not only satisfactory but also closer to artist-created contents.

The faithfulness compared with hand-drawn caricature styles was perceptually evaluated through a user study. Users were asked to choose the best caricature that looked like a hand-drawn caricature among different caricatures generated by state-of-the-arts methods and the method of the present disclosure. The responses for WarpGAN, AutoToon, U-GAT-IT, StarGANv2, and Toonification were compared with the response of the method according to an exemplary embodiment of the present disclosure. The method according to an exemplary embodiment of the present disclosure was evaluated using two different exaggeration factors (i.e., 0.5 and 1.0). The experiment was conducted twice, once for each exaggeration factor for the method of the present disclosure. Different users participated in each experiment to prevent a learning effect. There are several ways to compare, and it may be hard for the user to answer consistently if the caricature results of all methods are presented together for each question. Therefore, the user study was conducted by dividing the methods into two groups: specifically designed caricature generator methods (i.e., WarpGAN, and Auto-Toon) and general image-to-image translation methods (i.e., U-GAT-IT, StarGAN v2, and Toonification).

For each group, each user was given 30 questions randomly sampled from a pool of 71 questions. The question pool was constructed by generating caricatures for the input photographs used for the compared methods and the input photographs in FIG. 9. Five duplicate questions were added to filter out random selections. Users having provided inconsistent answers in more than three duplicate questions were excluded to obtain valid responses from 60 users for each group. Before starting the experiment, each user using hand-drawn caricatures, five training questions were presented to the users to expose the user to realistic caricature styles. For each training question, the users were asked to choose a best hand-drawn caricature that matches the input photograph. The user study was conducted using Amazon Mechanical Turk.

Figure 10:
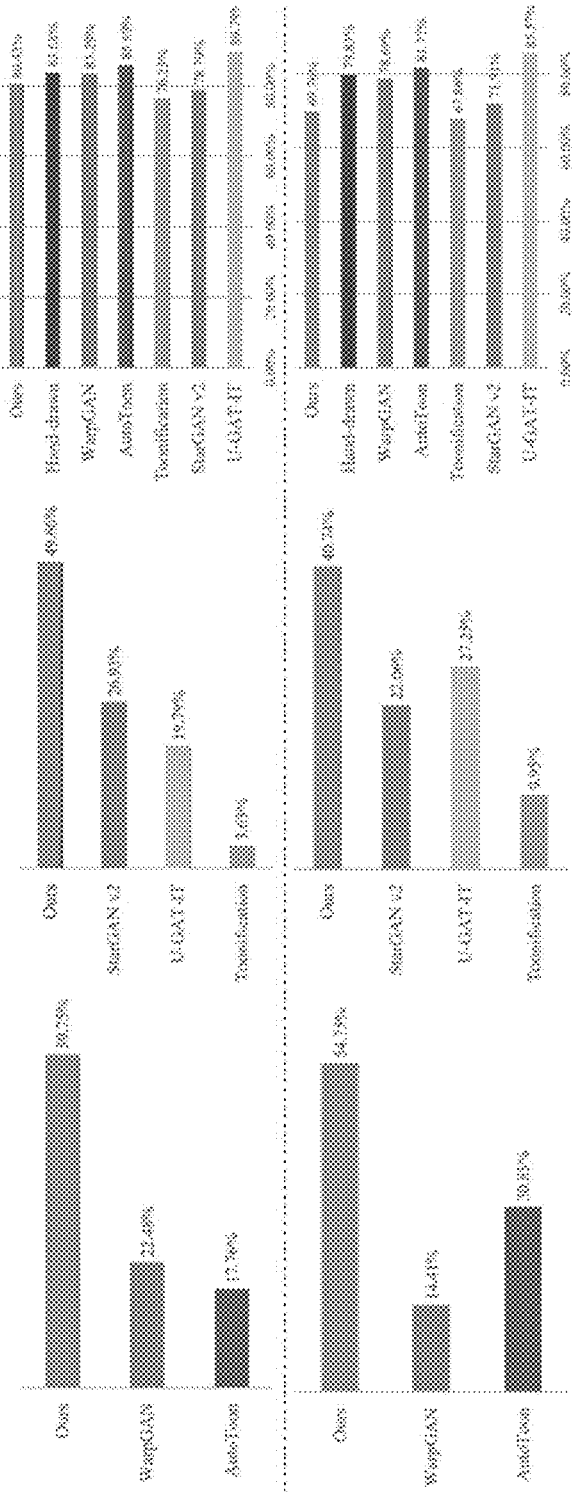
FIGS. 10(a), 10(b), and 10(c) show results of a user study.

FIGS. 10(a), 10(b), and 10(c) show the results of the user study. The upper and lower parts of the drawing show the results when the exaggeration factors are 0.5 and 1.0, respectively. FIGS. 10(a) and 10(b) show the faithfulness evaluation results compared with hand-drawn caricature styles. The method of the present disclosure outperforms other methods by a large margin in terms of the quality of the caricature styles. FIG. 10(c) shows the evaluation results of the identity preservation. The method of the present disclosure exhibits identification rates comparable to other methods. Regardless of the exaggeration factor, the method of the present disclosure outperformed the conventional methods in both groups.

In addition, the degree of identity preservation of the method according to the present disclosure was perceptually evaluated through another user study. The users were asked to choose a photograph that matches the identity of an input caricature. The input caricature for each question was one of Hand-drawn, WarpGAN, AutoToon, Toonification, U-GAT-IT, StarGAN v2, and those generated by the method of the present disclosure. The method according to an exemplary embodiment of the present disclosure was evaluated using two different exaggeration factors (i.e., 0.5 and 1.0). For a fair comparison, the experiment was conducted twice, once for each exaggeration factor for the method of the present disclosure to balance a number of exposure for each exaggeration factor, instead of conducting the experiment for both the exaggeration factors simultaneously. For each question, the users were provided with five choices of photographs, among which one contains a correct answer with the same identity as the input caricature but with a different pose while the remaining options contain faces similar to the correct answer. This user study was also conducted using Amazon Mechanical Turk.

The results show that the caricature generated by the exaggeration factor of 0.5 according to an exemplary embodiment of the present disclosure exhibits the identity preservation comparable to the other methods including hand-drawn caricatures, while the caricature generated by the exaggeration factor of 1.0 according to an exemplary embodiment of the present disclosure exhibits a lower identity preservation as shown in FIG. 10(c).

StyleCariGAN has an inverse mapping for the caricature-to-photo translation since it is trained with the cyclic consistency. To translate a caricature to a photograph, the caricature image is first encoded into the W+ space of the caricature StyleGAN. Given the encoded vector as an input, it is possible to simply use the c2p-StyleCariGAN trained for cyclic consistency to generate a photograph that resembles the given caricature.

Figure 11:
FIG. 11 shows a multi-scale control over a shape exaggeration.

FIG. 11 shows a multi-scale control over the shape exaggeration. The StyleCariGAN provides 4-scale control over the exaggeration degrees. A parameter $\alpha_1$ controls the exaggeration of a coarsest scale, and a parameter $\alpha_4$ controls a finest scale. Each row in the drawing shows a different scale of editing. At each row, a set of parameters in the label is modulated while unspecified parameters are fixed at 1. The first row shows the effect of the shape exaggeration blocks from no exaggeration to a full exaggeration. Removal of the shape exaggeration blocks may result in a caricature with a photograph-like structure (See a first row, first column). Application of all the shape exaggeration blocks may result in a caricature with desirable and realistic deformations structure (See the first row, fifth column). The other rows show the multi-scale control of the exaggeration. Addition of feature modulations of different scales from $\alpha_4$ to $\alpha_2$ produces structural deformations of increasing scales (See one of a second to fourth rows, first column). The parameter $\alpha_1$ for the coarsest feature modulation affects overall facial shape (See row 4, columns 1-4). The caricature results in the rightmost column are all the same as each other because the parameter values are all 1.

In FIG. 11, the first row demonstrates contributions of the shape exaggeration blocks, and a leftmost and rightmost images show the results without and with the shape exaggeration blocks, respectively. It can be clearly seen in the drawing that the shape exaggeration blocks play a critical role in generating the required shape changes in the caricature while preserving an overall color style. In addition, FIG. 11 shows some typical examples of controlling the degree of exaggerations in the resultant caricature by adding the scaling factors to the shape exaggeration blocks.

The device and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A caricature generating method, comprising:
providing a generation network comprising a plurality of layers connected in series including coarse layers of lowest resolutions and pre-trained to be suitable for synthesizing a shape of a caricature and fine layers of highest resolutions and pre-trained to be suitable for tuning a texture of the caricature;
applying input feature maps representing an input facial photograph to the coarse layers to generate shape feature maps and deforming the shape feature maps by shape exaggeration blocks each comprising at least one convolutional layer to generate deformed shape feature maps;
applying the deformed shape feature maps to the fine layers to change a texture represented by the deformed shape feature maps and generate output feature maps; and
generating a caricature image according to the output feature map,
wherein the providing the generation network comprises:
preparing a plurality of series-connected caricature generation learning layers, training the plurality of series-connected caricature generation learning layers with caricature images, preparing a plurality of series-connected photo reconstruction learning layers, and training the plurality of series-connected photo reconstruction learning layers with photographs; and
adopting caricature generation learning layers of the lowest resolutions as the coarse layers, adopting photo reconstruction learning layers of the highest resolutions as the fine layers, and combining the coarse layers and the fine layers to configure the generation network.

2. The caricature generating method of claim 1, wherein providing the generation network further comprises:
connecting the shape exaggeration blocks to the coarse layers in the generation network.

3. The caricature generating method of claim 2, wherein each of the shape exaggeration blocks is connected to respective one of the coarse layers in the generation network.

4. The caricature generating method of claim 3, wherein providing the generation network further comprises:
performing a machine learning on the generation network, wherein performing the machine learning on the generation network comprises:
determining a generative adversarial image loss by a first discriminator configured to discriminate images and determining a generative adversarial feature map loss by a second discriminator configured to discriminate feature maps; and
training the generation network based on the generative adversarial image loss and the generative adversarial feature map loss.

5. The caricature generating method of claim 4, wherein applying the input feature maps to the coarse layers to generate shape feature maps and deforming the shape feature maps by the shape exaggeration blocks to generate deformed shape feature maps comprising:
generating caricature shape feature maps by applying the shape feature maps to the shape exaggeration blocks; and
adding the caricature shape feature maps to the shape feature maps to generate the deformed shape feature maps.

6. The caricature generating method of claim 4, wherein performing the machine learning on the generation network further comprises:
calculating a cyclic consistency loss in a process of translating the input feature maps into the output feature maps and translating the output feature maps into reconstructed input feature maps; and
training the shape exaggeration blocks such that a total loss which is defined as a weighted sum of a plurality of losses including the cyclic consistency loss is minimized.

7. The caricature generating method of claim 6, wherein performing the machine learning on the generation network further comprises:
calculating an attribute matching loss defined as a binary cross entropy loss between attributes of the input facial photograph and attributes of the caricature,
wherein the total loss is calculated as the weighted sum of the plurality of losses including the cyclic consistency loss and the attribute matching loss.

8. The caricature generating method of claim 5, wherein generating the caricature shape feature maps comprises:
receiving, from a user, exaggeration magnitudes indicating a degree of deformation of the caricature; and
changing a scale factor for each of the shape exaggeration blocks, the scale factor indicating a ratio of a corresponding caricature shape feature map to be added to a corresponding shape feature map.

9. A caricature generating apparatus based on an artificial neural network, comprising:
a memory storing program instructions; and
a processor coupled to the memory and executing the program instructions stored in the memory,
wherein the processor is configured to:
prepare a generation network comprising a plurality of layers connected in series including coarse layers of lowest resolutions and pre-trained to be suitable for synthesizing a shape of a caricature and fine layers of highest resolutions and pre-trained to be suitable for tuning a texture of the caricature;
apply input feature maps representing an input facial photograph to the coarse layers to generate shape feature maps and deforming the shape feature maps by shape exaggeration blocks each comprising at least one convolutional layer to generate deformed shape feature maps;
apply the deformed shape feature maps to the fine layers to change a texture represented by the deformed shape feature maps and generate output feature maps; and
generate a caricature image according to the output feature map, and
wherein the processor is further configured, for preparing the generation network, to:
prepare a plurality of series-connected caricature generation learning layers, train the plurality of series-connected caricature generation learning layers with caricature images, prepare a plurality of series-connected photo reconstruction learning layers, and train the plurality of series-connected photo reconstruction learning layers with photographs; and
adopt caricature generation learning layers of the lowest resolutions as the coarse layers, adopt photo reconstruction learning layers of the highest resolutions as the fine layers, and combining the coarse layers and the fine layers to configure the generation network.

10. The caricature generating apparatus of claim 9, wherein the processor is further configured to:
connect the shape exaggeration blocks to the coarse layers in the generation network.

11. The caricature generating apparatus of claim 10, wherein each of the shape exaggeration blocks is connected to respective one of the coarse layers in the generation network.

12. The caricature generating apparatus of claim 9, wherein the processor is further configured to:
perform a machine learning on the generation network,
determine a generative adversarial image loss by a first discriminator configured to discriminate images and
determine a generative adversarial feature map loss by a second discriminator configured to discriminate feature maps; and
train the generation network based on the generative adversarial image loss and the generative adversarial feature map loss.

13. The caricature generating apparatus of claim 9, wherein the processor is further configured to:
generate caricature shape feature maps by applying the shape feature maps to the shape exaggeration blocks; and
add the caricature shape feature maps to the shape feature maps to generate the deformed shape feature maps.

14. The caricature generating apparatus of claim 9, wherein the processor is further configured to:
calculate a cyclic consistency loss in a process of translating the input feature maps into the output feature maps and translating the output feature maps into reconstructed input feature maps; and
train the shape exaggeration blocks such that a total loss which is defined as a weighted sum of a plurality of losses including the cyclic consistency loss is minimized.

15. The caricature generating apparatus of claim 14, wherein the processor is further configured to:
calculate an attribute matching loss defined as a binary cross entropy loss between attributes of the input facial photograph and attributes of the caricature; and
calculate the total loss as the weighted sum of the plurality of losses including the cyclic consistency loss and the attribute matching loss.

16. The caricature generating apparatus of claim 15, wherein the processor is further configured to:
receive, from a user, exaggeration magnitudes indicating a degree of deformation of the caricature; and
change a scale factor for each of the shape exaggeration blocks, the scale factor indicating a ratio of a corresponding caricature shape feature map to be added to a corresponding shape feature map.

* * * * *